US007658344B2

(12) United States Patent
Hancock et al.

(10) Patent No.: US 7,658,344 B2
(45) Date of Patent: *Feb. 9, 2010

(54) HOUSING FOR INFORMATION STORAGE MEDIUM AND METHOD USING SAME

(75) Inventors: Reed A. Hancock, Tucson, AZ (US); James A. Jackmond, Tucson, AZ (US); Linda S. Daanen, legal representative, Tucson, AZ (US); Joseph C. Ramirez, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 73 days.

This patent is subject to a terminal disclaimer.

(21) Appl. No.: 11/961,755

(22) Filed: Dec. 20, 2007

(65) Prior Publication Data

US 2008/0094752 A1   Apr. 24, 2008

Related U.S. Application Data

(63) Continuation of application No. 10/895,176, filed on Jul. 20, 2004, now Pat. No. 7,311,282, which is a continuation-in-part of application No. 10/107,087, filed on Mar. 25, 2002, now Pat. No. 6,764,037.

(51) Int. Cl.
*G11B 23/107* (2006.01)
(52) U.S. Cl. ..................... 242/348; 360/132

(58) Field of Classification Search ............... 242/348, 242/347.1; 360/83, 85, 93, 132, 133; 369/291
See application file for complete search history.

(56) References Cited

U.S. PATENT DOCUMENTS 6,764,037 B2 *  7/2004  Hancock et al. ............. 242/348
7,311,282 B2 * 12/2007  Hancock et al. ............. 242/348

* cited by examiner

*Primary Examiner*—William A Rivera
(74) *Attorney, Agent, or Firm*—Dale F. Regelman; Quarles & Brady LLP

(57) ABSTRACT

A method to write information to, or retrieve information from, an information storage medium disposed within a portable data storage cartridge moveably disposed in a data storage and retrieval system, wherein the data storage and retrieval system further comprises a data storage device. The portable data storage cartridge comprises a moveable curved door slidingly disposed within the enclosure, and a tape reel rotatably disposed within the enclosure, wherein the moveable curved door and the tape reel are non-concentric. The method retrieves the portable data storage cartridge from a storage slot, transports that portable data storage cartridge to a data storage device, disposes the portable data storage cartridge in the data storage device. The method further moves the moveable curved door from said a position to a second position, and reads information from and/or writes information to, the information storage medium.

20 Claims, 10 Drawing Sheets

HOUSING FOR INFORMATION STORAGE MEDIUM AND METHOD USING SAME

CROSS-REFERENCE TO RELATED APPLICATIONS

This application is a Continuation Application claiming priority from a U.S. Utility application Ser. No. 10/895,176 and filed Jul. 20, 2004 now U.S. Pat. No. 7,311,282, which is a Continuation-In-Part application Ser. No. 10/107,087 and filed Mar. 25, 2002, claiming priority from U.S. Pat. No. 6,764,037.

FIELD OF THE INVENTION

This invention relates to the field of housings for moveable information storage media. In certain embodiments, the invention relates to a tape storage cartridge.

BACKGROUND OF THE INVENTION

Tape media, such a magnetic tape, is a common medium for the storage of data to be utilized by a computer. Magnetic tape has found widespread use as a data storage medium because it provides a relatively inexpensive solution for storing large amounts of data. Magnetic tape is typically stored on cartridges of which there are a variety of different types and sizes. One reason for the variety of cartridge types is the variety of different tape drives in which the cartridges are used.

Tape cartridges are comprised essentially of a cartridge shell which houses a rotatably mounted reel. Magnetic tape is wound around the hub of the reel. Reel flanges are used to contain the magnetic tape as the magnetic tape is wound on the hub. A fully loaded tape cartridge has magnetic tape wound around the hub such that the multiple layers of tape form a stack of magnetic tape extending out to near the end of the reel flanges. The tape cartridge is inserted into a tape drive mechanism which automatically threads the magnetic tape from the tape cartridge through the tape guide mechanism of the tape drive assembly. The tape is then available to the tape drive mechanism for the reading and writing of data.

Tape cartridges containing, for example, magnetic tape, are often used in automated data storage libraries. Such automated media storage libraries are known for providing cost effective access to large quantities of stored media. One (or more) accessor typically accesses the tape cartridges from a plurality of storage slots and delivers the accessed tape cartridge to a data storage drive for reading and/or writing data on the accessed tape cartridge. Suitable electronics both operate the accessor and operate the data storage drives to transmit and/or receive data from an attached on-line host computer system.

In a conventional automated media storage library, the storage slots are arranged in a planar orthogonal arrangement forming a "wall" of storage slots for holding data storage media. The plane may be a flat plane, or may be a cylindrical surface. To double the storage capacity, two "walls" of storage slots may be provided on either side of the accessor.

SUMMARY OF THE INVENTION

Applicants' invention includes a method to write information to, or retrieve information from, an information storage medium disposed within Applicants' portable data storage cartridge moveably disposed in a data storage and retrieval system, wherein the data storage and retrieval system further comprises a data storage device. Applicant's portable data storage cartridge comprises a top, a bottom, and a plurality of sides, wherein the plurality of sides in combination with the top and the bottom define an enclosure having an opening. Applicants' portable data storage cartridge further comprises a moveable curved door slidingly disposed within the enclosure, and a tape reel rotatably disposed within the enclosure, wherein the moveable curved door and the tape reel are non-concentric.

The method retrieves the portable data storage cartridge from a storage slot, transports that portable data storage cartridge to a data storage device, disposes the portable data storage cartridge in the data storage device. The method further moves the moveable curved door from said a position to a second position, and reads information from and/or writes information to, the information storage medium.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

Referring to the illustrations, like numerals correspond to like parts depicted in the figures. The invention will be described as embodied in a portable data storage cartridge disposed in an information storage and retrieval system. The following description of Applicant's apparatus and method is not meant, however, to limit Applicant's invention to tape cartridges or to data processing applications, as the invention herein can be applied to information storage in general.

Figure 1A:
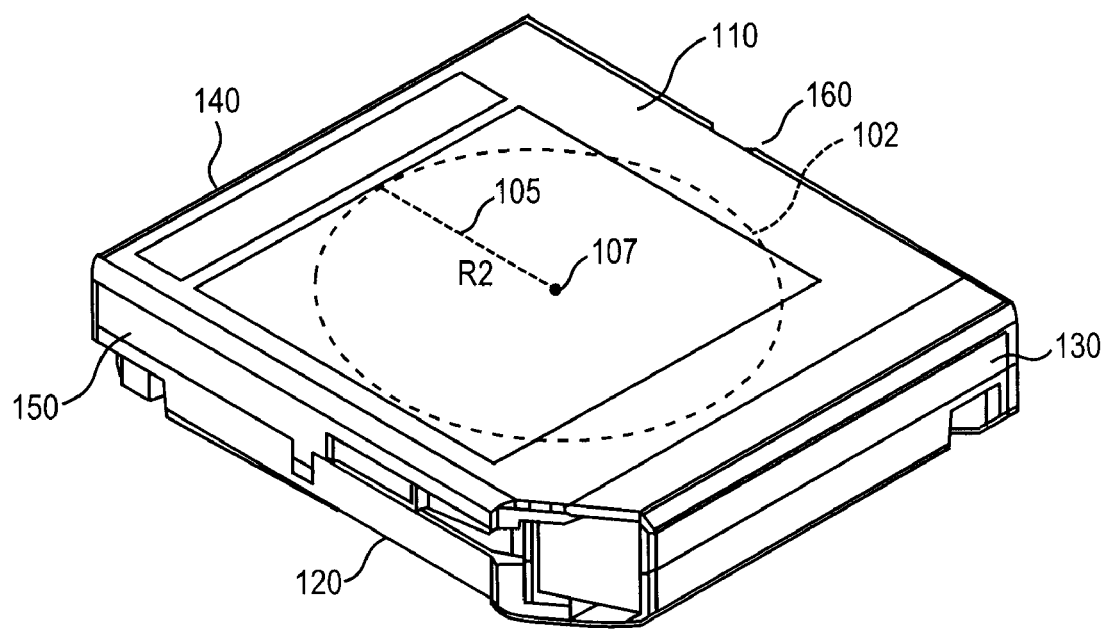
FIG. 1A shows a first perspective view of Applicants' housing.
Figure 1A:
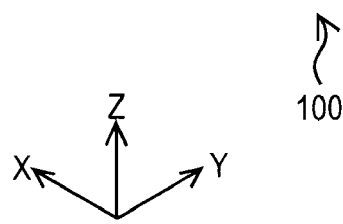
Figure 1B:
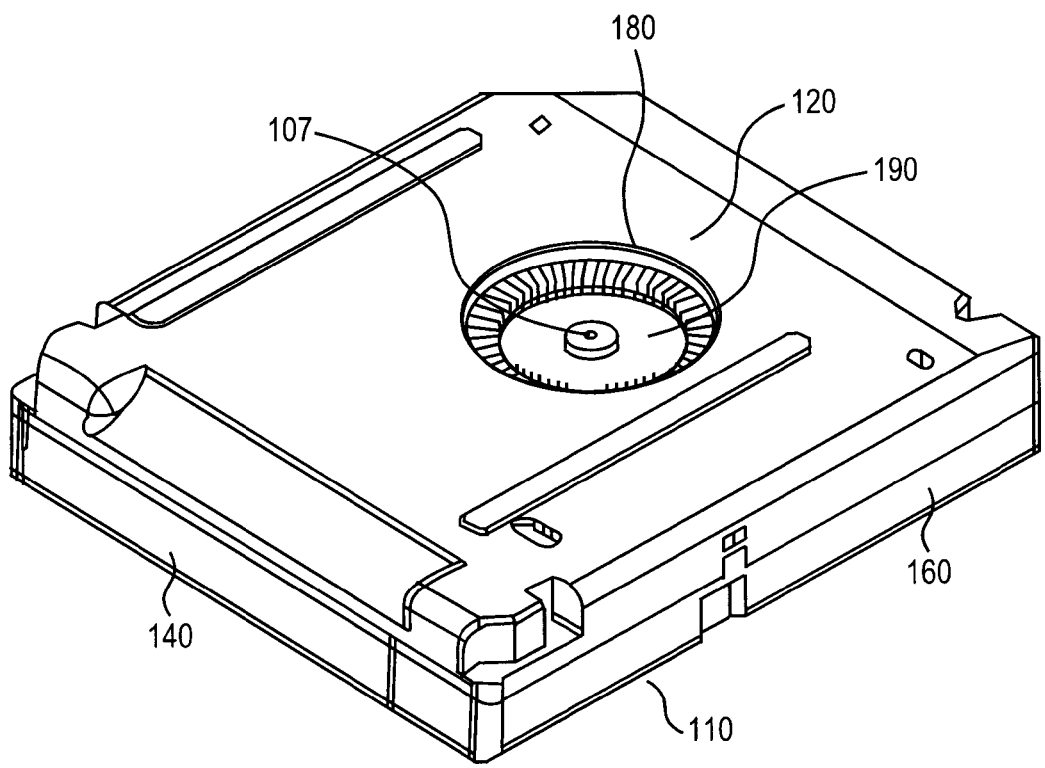
FIG. 1B shows a second perspective view of Applicants' housing.

FIGS. 1A and 1B show Applicants' housing 100. Rotatable reel 102 is moveably disposed within housing 100. Rotatable reel 102 has a radius of curvature 105, i.e. R2. Rotatable reel can be rotated in the X/Y plane around center point 107.

There are various features not shown on housing 100, such as locating notches, write-inhibiting switches, and the like. Housing 100 is only exemplary, and certain housing embodiments of present invention are applicable to any configuration of housing 100, and are useful for enclosing various information storage media.

Figure 2:
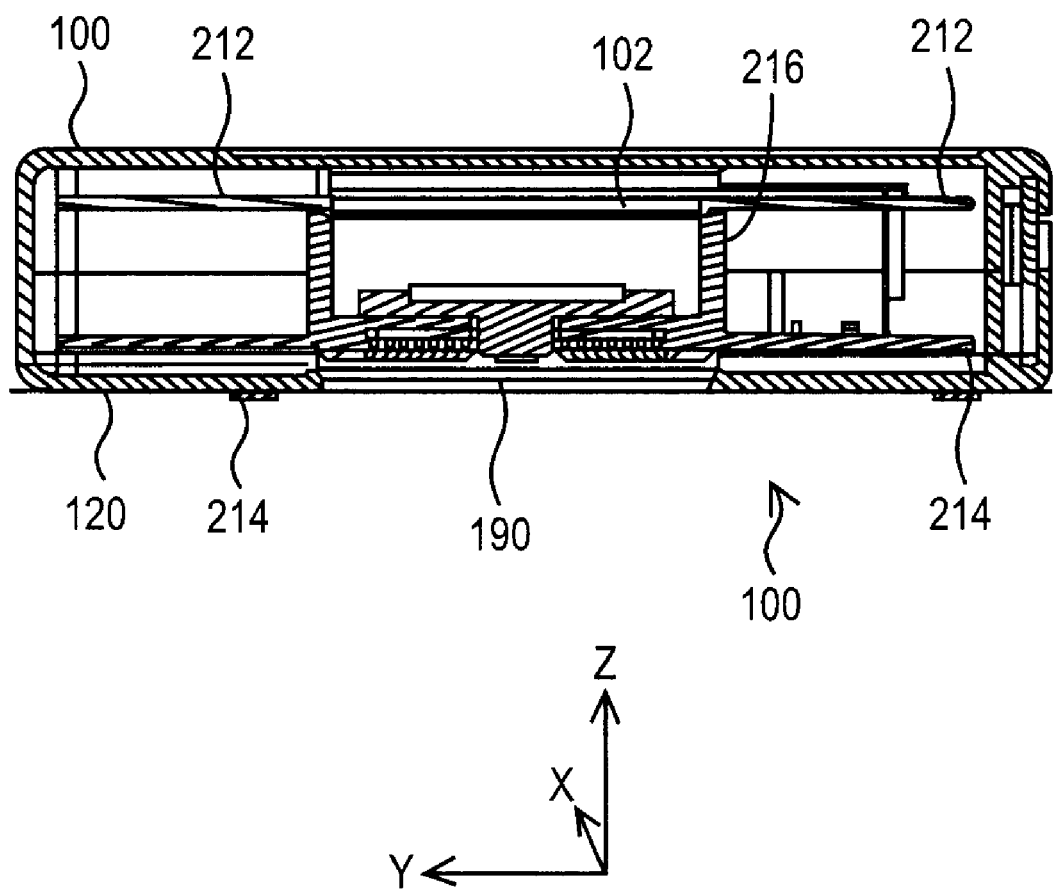
FIG. 2 shows a cross-sectional view of Applicants' housing.

Referring to FIG. 1B, bottom 120 includes aperture 180. Assembly 190 is disposed on the bottom portion of reel 102 adjacent aperture 180. FIG. 2 shows a cross-section view Applicants' housing. Tape reel 102 comprises first flange 212, second flange 214, and hub 216. Flanges 212 and 214 connect to, and extend radially outward from, hub 216 forming a channel between them in which a tape storage medium (not shown in FIG. 2) is contained as that tape is wound around hub 216.

As those skilled in the art will appreciate, when housing 100 is removeably disposed in, i.e. mounted in, a data storage device, a drive motor mechanism (not shown in FIG. 2) extends through aperture 180 to releaseably engage rotatable assembly 190. In response to signals from a tape drive controller, the drive motor mechanism rotates reel 102. The operation of the drive motor mechanism is coordinated with the remainder of the tape drive mechanism to draw the tape from Applicants' housing for use in the tape drive mechanism to, for example, read and/or write data thereon.

Figure 3:
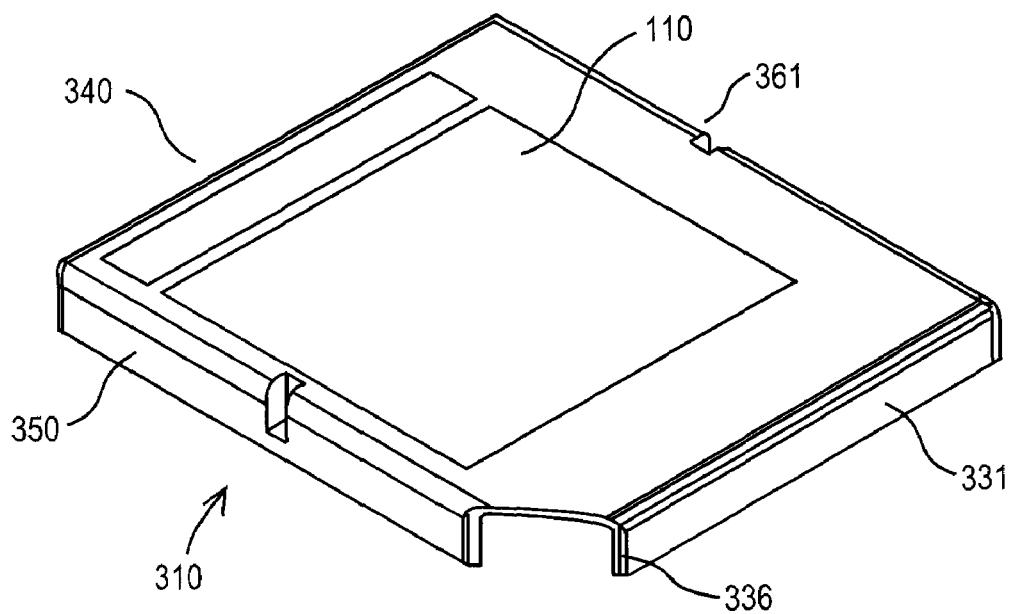
FIG. 3 shows a perspective view of the assemblies used to form Applicants' housing.
Figure 3:
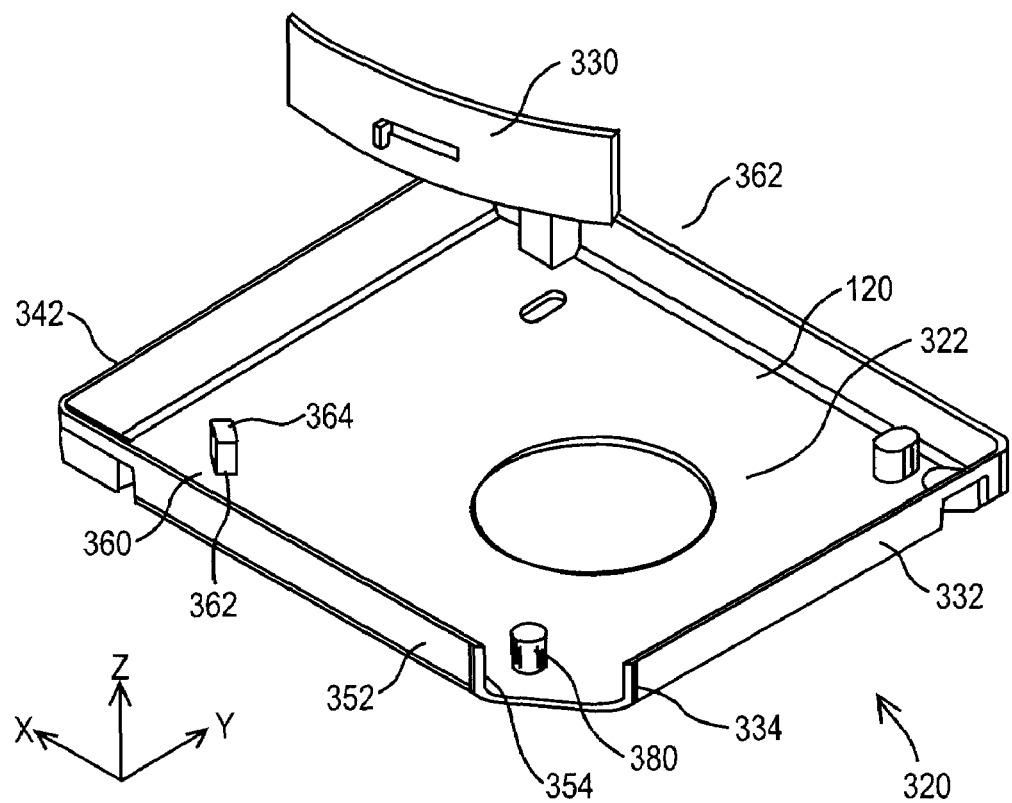

Referring to FIG. 3, in certain embodiments housing 100 comprises first assembly 310, second assembly 320, and moveable door assembly 330. First assembly 310 comprises top 110 (FIG. 1) and sides 331, 340, 350, and 361 which attach to side 110 and extend outwardly therefrom. First assembly 310 is formed from any rigid material, including plastic, metal, and combinations thereof. First assembly 310 can be molded as an integral body, or can be formed from sides 110, 330, 340, 350, and 361, which have been attached as shown in FIG. 3 using conventional techniques, including, for example, adhesive bonding, plastic welding, spot welding, welding, use of mechanical fasteners such as screws, nuts, bolts, and the like.

Second assembly 320 comprises bottom 120 (FIG. 1), and sides 332, 342, 352, and 362, which attach to side 120 and extend outwardly therefrom. Second assembly 320 is formed from any rigid material, including plastic, metal, and combinations thereof. Second assembly 320 can be molded as an integral body, or can be formed from sides 120, 332, 342, 352, and 362, which have been attached as shown in FIG. 3 using conventional techniques, including, for example, adhesive bonding, plastic welding, spot welding, welding, use of mechanical fasteners such as screws, nuts, bolts, and the like.

Assembly 320 includes interior surface 322. Member 380 is attached to surface 322, adjacent end 354 of side 352, and extends outwardly from surface 322. In certain embodiments, member 380 has a cylindrical shape, i.e. a circular cross-section. In certain embodiments, member 380 has a substantially square cross-section. By "substantially" square cross-section, Applicants' mean either a square cross-section, or a square cross-sectional shape which includes rounded corners. In certain embodiments, member 380 has a substantially rectangular cross-section. In certain embodiments, member 380 has an elliptical cross-section. In certain embodiments, member 380 has a substantially pentagonal cross-section. In certain embodiments, member 380 has a substantially hexagonal cross-section.

Member 360 is disposed on surface 322 and extends outwardly therefrom. In certain embodiments, member 360 has a cylindrical shape, i.e. a circular cross-section. In certain embodiments, member 360 has a substantially square cross-section. In certain embodiments, member 360 has a substantially rectangular cross-section. In certain embodiments, member 360 has an elliptical cross-section. In certain embodiments, member 360 has a substantially pentagonal cross-section. In certain embodiments, member 380 has a substantially hexagonal cross-section. First end 362 of member 360 is attached to surface 322, adjacent side 352. Second end, i.e. the distal end, 364 of member 360 extends outwardly from surface 322.

Figure 4:
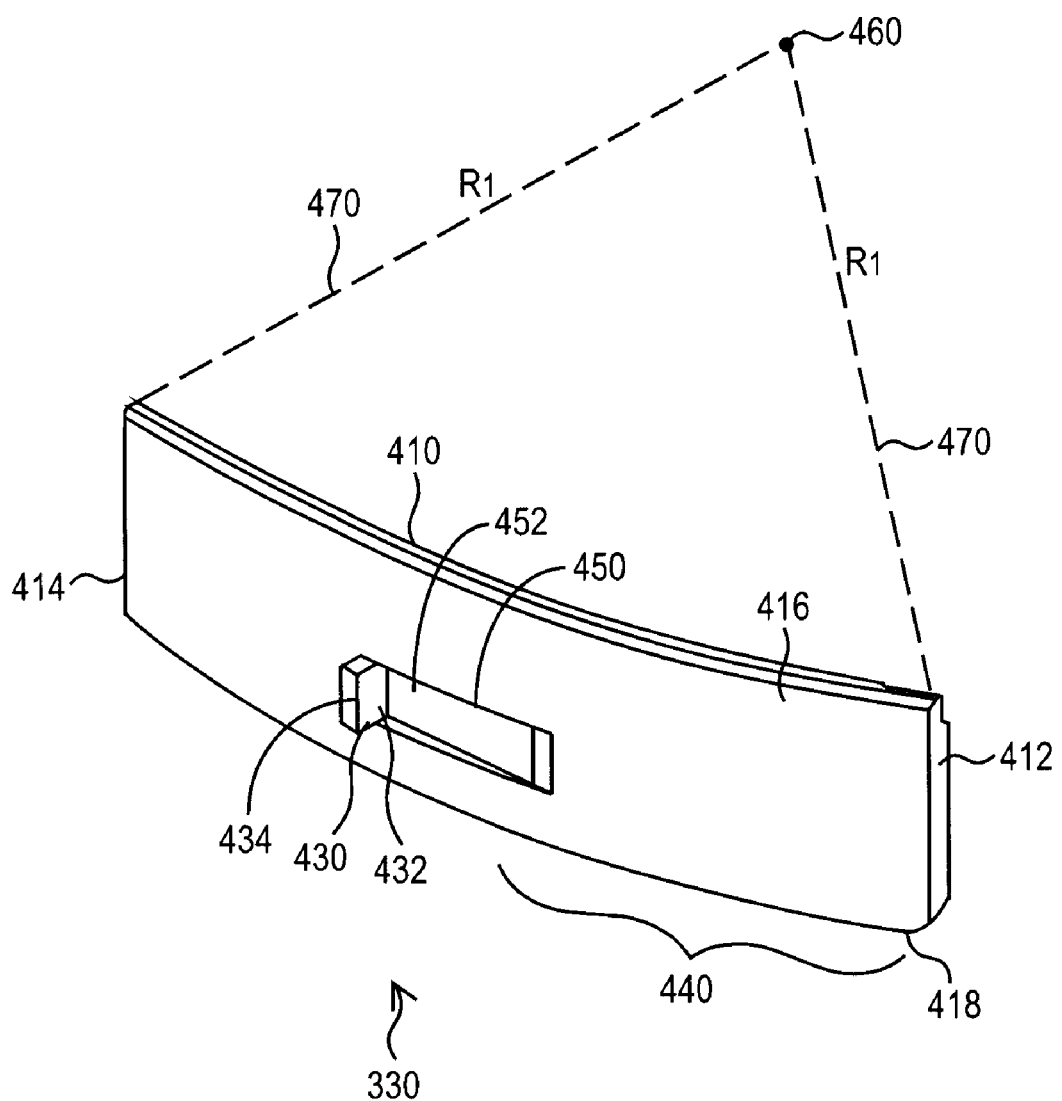
FIG. 4 shows a perspective view of a curved, moveable door assembly disposed within Applicants' housing.

Referring now to FIG. 4, moveable door assembly 330 comprises member 410 which includes first end 412, second end 414, and first surface 416. Member 410 has a "curved" shape that defines an arc comprising a portion of a circle having radius 470, i.e. radius of curvature $R_1$, and a centerpoint 460.

Figure 5:
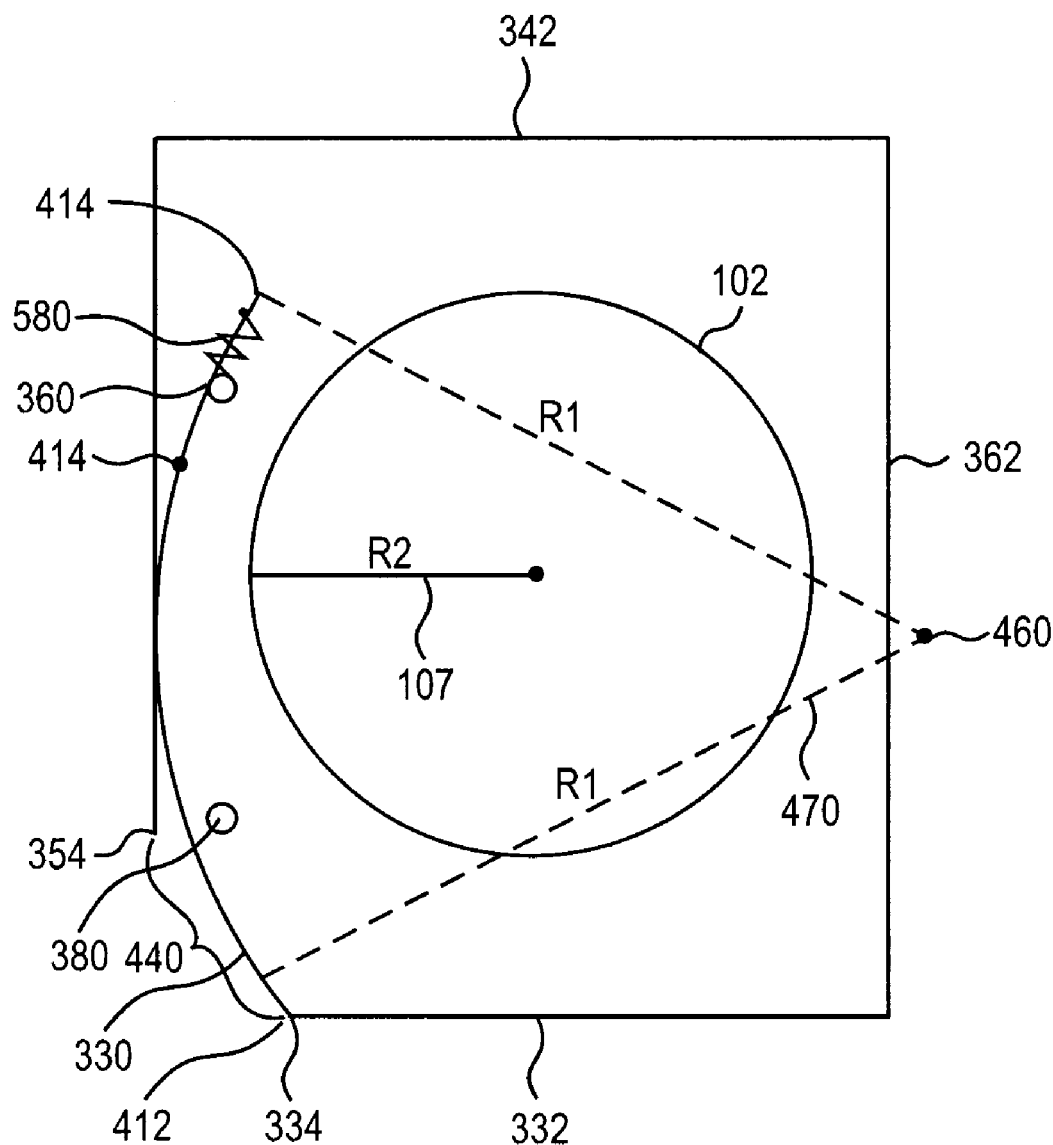
FIG. 5 is a top view showing Applicants' curved, moveable door assembly in relation to a reel rotatably disposed within Applicants' housing.
Figure 6:
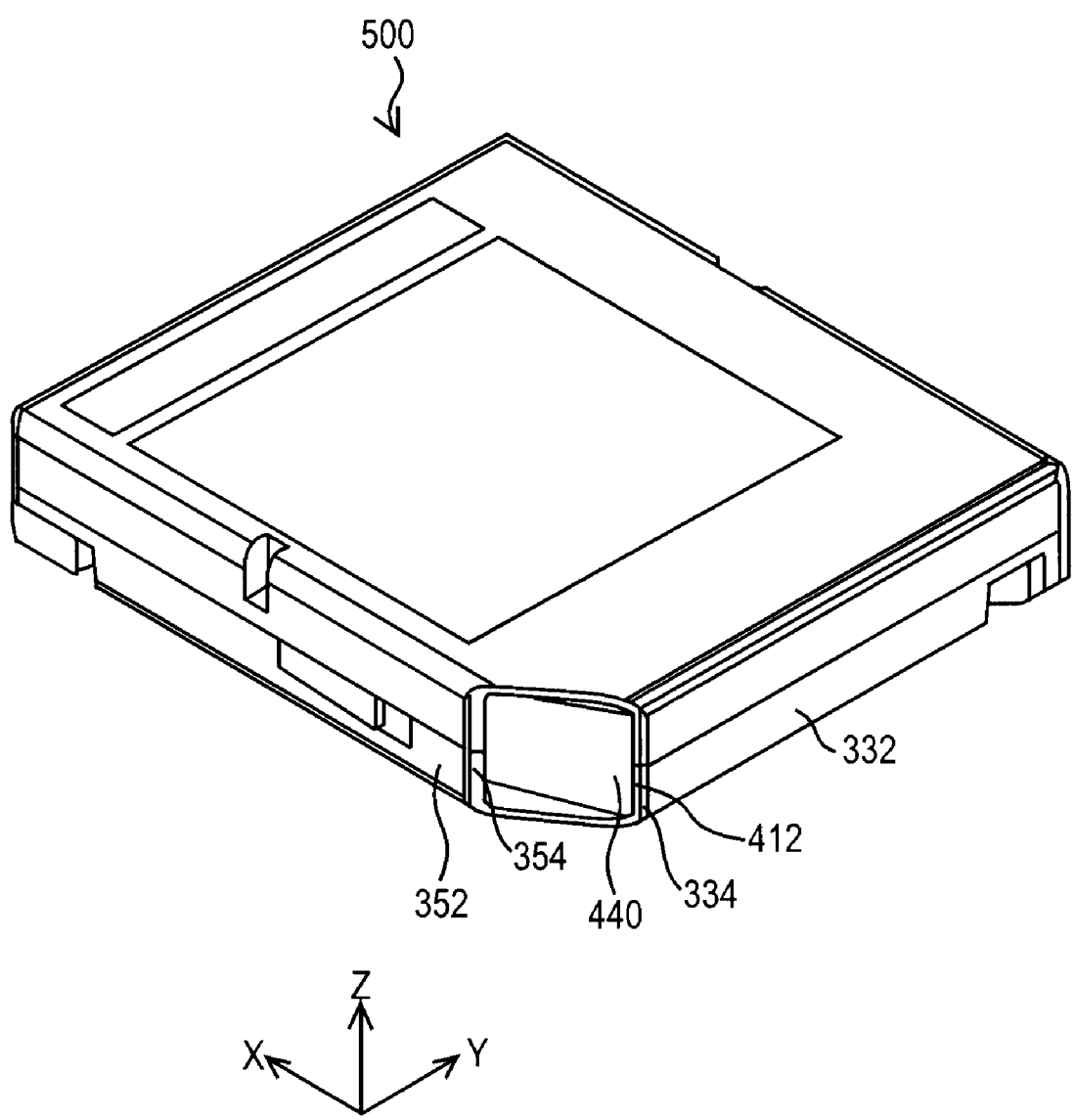
FIG. 6 shows a perspective view of Applicants' housing where the curved, moveable door is in a closed position.

Member 430 is disposed on member 410 and extends outwardly therefrom. Member 430 comprises first end 432 and second end 434. First end 432 is disposed on surface 416 with second end 434 extending outwardly from surface 416. In certain embodiments, surface 416 includes groove 450. In certain embodiments, first end 432 of member 430 is disposed on floor portion 452 of groove 450. FIGS. 5 and 6 show moveable door assembly 330 slidingly disposed in housing 100 in a first, i.e. closed, position, wherein end 412 (FIG. 4) of door portion 440 (FIG. 4) is disposed adjacent end 334 (FIG. 3) of side 332.

In certain embodiments, Applicants' housing includes spring 580. Spring 580 has a first end attached to door assembly 330 at point 414, and a second end attached to member 360. With assembly 330 disposed in the first position shown in FIG. 5, spring 580 comprises a first distance D1 between attachment point 414 and member 360. In this first position, spring 580 exerts a first force $F_1$ on assembly 330. In the absence of an opposing force, first force $F_1$ keeps assembly 330 in the first position shown in FIG. 5. In graph 700 (FIG. 7), position $X_1$ corresponds to the above-described first position wherein end 412 is disposed end 334 (FIGS. 3, 5, 6) by first force $F_1$.

When moveable assembly 330 (FIGS. 3, 4, 5) is moved to the second, i.e. open, position, spring 580 is disposed in a second orientation, i.e. stretched. In this second orientation, a second distance $D_2$ exists between attachment point 414 and member 360. Second distance $D_2$ is greater than first distance $D_1$. In this second orientation, spring 580 exerts a second force $F_2$ on assembly 330. Second force $F_2$ is greater than first force $F_1$. In graph 700 (FIG. 7), position $X_2$ corresponds to the above-described second position wherein end 412 is disposed adjacent end 354 (FIGS. 3, 5, 6).

Figure 7:
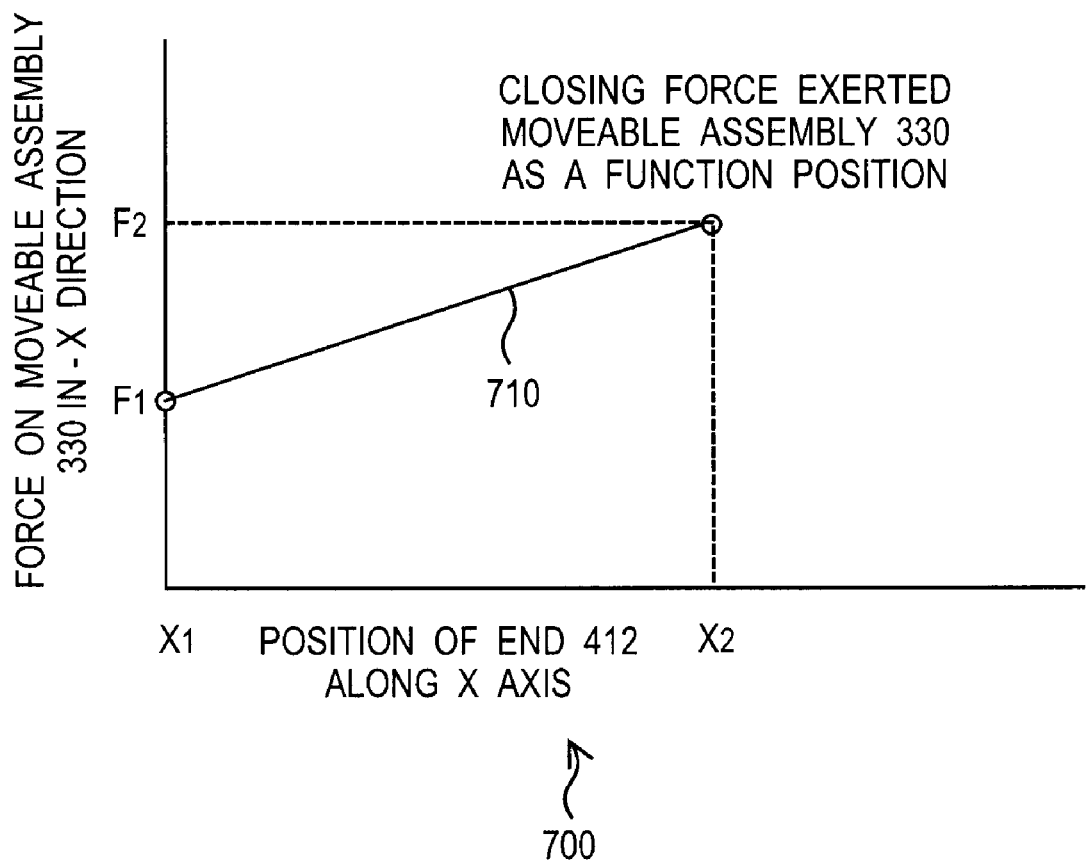
FIG. 7 graphically recites the force F2 required move Applicants' curved, moveable door to an open position

In the event a force equal to, or greater than, second force $F_2$ is exerted on moveable assembly 330 in the +X direction, then moveable assembly 330 slidingly moves from the first position, i.e. closed position, to the second position, i.e. open position. In graph 700 (FIG. 7), curve 710 represents the closing force exerted on moveable assembly 330 as a function of the position of end 412 in the X direction. In FIG. 7, this closing force has a linear relationship with respect to the position of end 412. In other embodiments of Applicants' invention, this closing force has a more complex, i.e. quadratic, cubic, and the like, relationship to the position of moveable assembly 330.

FIG. 5 further shows radius of curvature 470 (FIGS. 4, 5) of moveable door assembly 330 and centerpoint 460 (FIGS. 4, 6) for that radius of curvature 470. Radius 470 corresponds to radius of curvature R1. As R1 increases, more room within housing 100 becomes available for rotatable reel 102. As shown in FIG. 5, centerpoint 460 lies outside the dimensions of housing 100.

FIG. 5 further shows rotatable reel 102 (FIGS. 1, 2, 5) having a radius 107 (FIGS. 1, 5) and centerpoint 107 (FIGS. 1, 5). Centerpoint 107 lies within the dimensions of housing 100. Thus, moveable door assembly 330 and rotatable reel 102 are non-concentric. By "non-concentric," Applicants mean curved moveable door assembly 330 and rotatable reel 102 have differing radii of curvature and different centerpoints. Radius 107 corresponds to radius of curvature R2. In certain embodiments, R1/R2 is greater than 2. In certain embodiments, R1/R2 is greater than 3.

Figure 8:
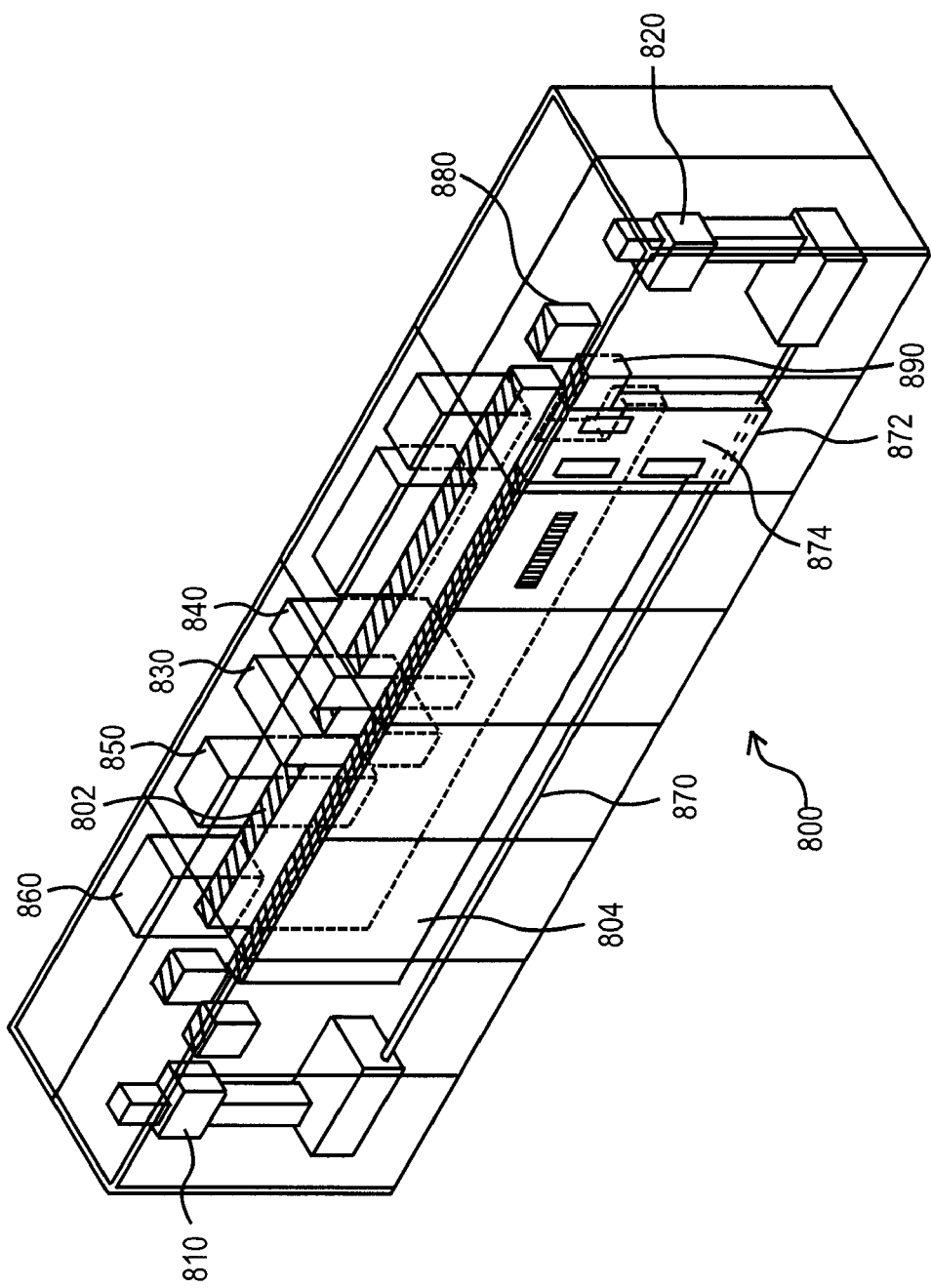
FIG. 8 shows a perspective view of Applicants' automated data storage library.

Referring now to FIG. 8, automated data storage and retrieval system 800 is shown having a first wall of storage slots 802 and a second wall of storage slots 804. One or more of Applicants' portable data storage cartridges are individually stored in one or more of these storage slots.

Applicant's automated data storage and retrieval system includes one or more accessors, such as accessors 810 and 820. An accessor is a robotic device which accesses portable data storage media from first storage wall 802 or second storage wall 804, transports that accessed media to data storage devices 830/840 for reading and/or writing data thereon, and returns the media to a proper storage slot. As shown in FIG. 8, accessors 810 and 820 travel bi-directionally along rail 870 in an aisle disposed between first wall of storage slots 802 and second wall of storage slots 804.

In certain embodiments, device 860 comprises a library controller. In certain of these embodiments, library controller 860 is integral with a computer. In other embodiments, Applicants' data storage and retrieval system utilizes a distributed control network. In these distributed control network embodiments, device 860 may comprise a motion card pack.

Referring again to FIG. 8, operator input station 850 permits a user to communicate with Applicant's automated data storage and retrieval system 800. Power component 880 and power component 890 each comprise one or more power supply units which supply power to the individual components disposed within Applicant's automated data storage and retrieval system. Import/export station 872 includes access door 874 pivotally attached to the side of system 800. Applicants' portable data storage cartridges can be placed in the system, or in the alternative, removed from the system, via station 872/access door 874.

Applicants' data storage and retrieval system and data storage devices 830 and 840 include hardware and/or software such that when Applicants' portable data storage cartridge comprising an information storage medium disposed in Applicants' housing 100 is disposed in devices 830/840, a force equal to, or greater than, second force $F_2$ is exerted on distal end 434 (FIG. 4) of member 430 (FIG. 4) in a first direction, i.e. in the +X direction shown in FIGS. 5 and 6, causing moveable door assembly 330 (FIGS. 3, 4, 5) to move from the first/closed position to the second/open position, thereby allowing access by the data storage device to the information storage medium disposed within the portable data storage cartridge.

Figure 9:
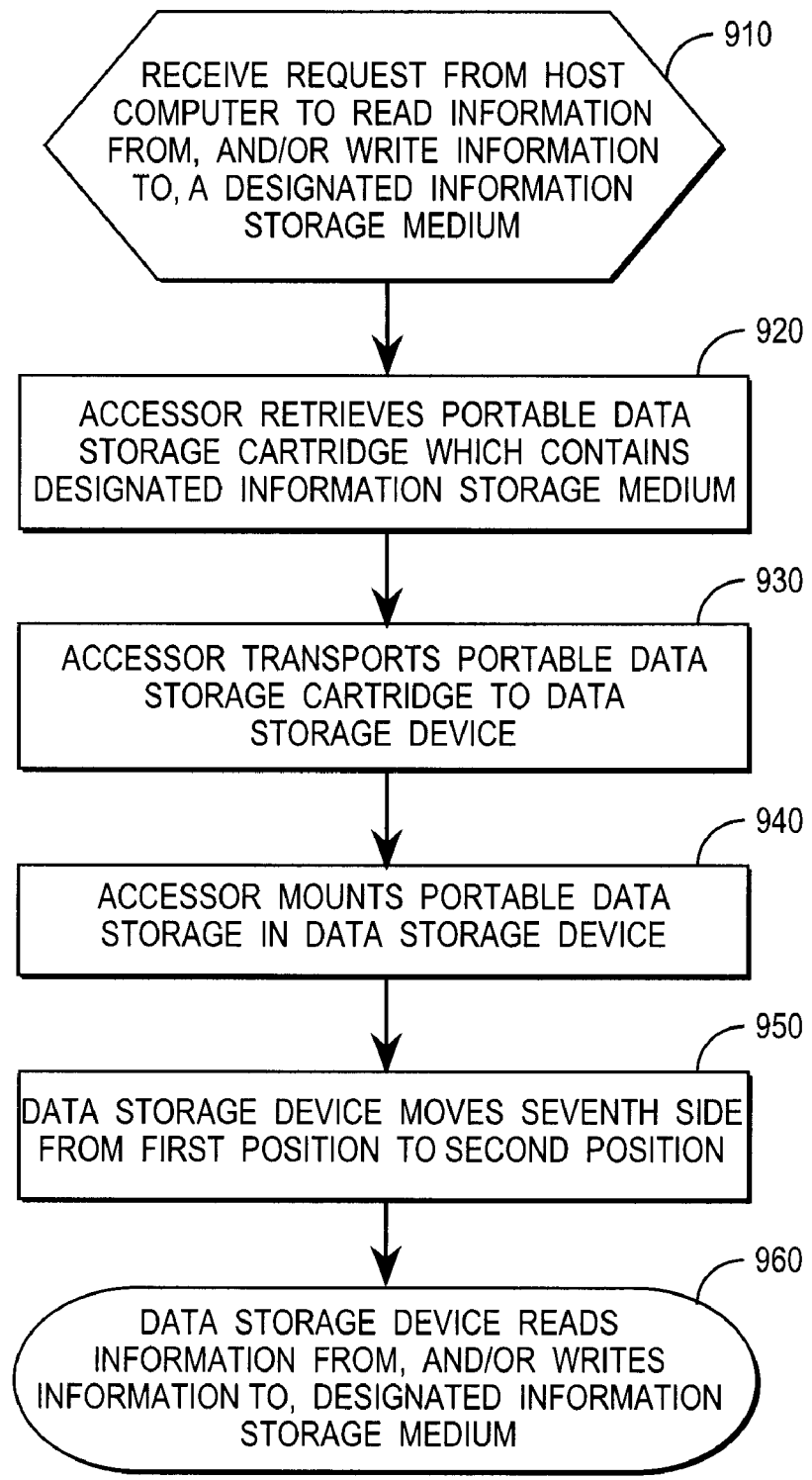
FIG. 9 summarizes the steps of Applicants' method to read information from, and/or write information to, an information storage medium disposed within Applicants' housing.

Applicants' invention includes a method to read information from, and/or write information to, an information storage medium disposed within a portable data storage cartridge comprising Applicants' housing, where that portable data storage cartridge is moveable disposed within Applicants' data storage and retrieval system, such as system 800. FIG. 9 summarizes the steps of Applicants' method.

In step 910, Applicants' data storage and retrieval system, such as system 800 (FIG. 8), receives a request from one or more host computers to read information from, and/or write information to, a designated information storage medium disposed within a portable data storage cartridge comprising Applicants' housing 100. In step 920, an accessor, such accessor 810 (FIG. 8)/820 (FIG. 8), retrieves the portable data storage cartridge from a storage slot, such as a storage slot disposed in first storage wall 802 (FIG. 8)/second storage wall 804 (FIG. 8).

In step 930, the accessor transports the portable data storage cartridge to a data storage device, such as device 830 (FIG. 8)/840 (FIG. 8). In step 940, the accessor disposes, i.e. mounts, the portable data storage cartridge in the data storage device. In step 950, the data storage device moves the curved, moveable door from the closed position to the open position. In step 960, the data storage device reads information from, and/or writes information to, the information storage medium disposed in Applicant's portable data storage cartridge.

Applicants' data storage and retrieval system includes a computer useable medium having computer readable program code disposed therein for writing information to and/or retrieving information from, an information storage medium disposed within Applicants' portable data storage cartridge.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to write information to, or retrieve information from, an information storage medium disposed within a portable data storage cartridge moveably disposed in a data storage and retrieval system, wherein said data storage and retrieval system further comprises a data storage device;

wherein said portable data storage cartridge comprises:
a top;
a bottom;
a plurality of sides, wherein said plurality of sides in combination with said top and said bottom define an enclosure having an opening;
a moveable curved door slidingly disposed within said enclosure;
a tape reel rotatably disposed within said enclosure, wherein said moveable curved door and said tape reel are non-concentric;
said method comprising the steps of:
retrieving said portable data storage cartridge from one of said one or more storage slots;
transporting said portable data storage cartridge to said data storage device;
disposing said portable data storage cartridge in said data storage device;
moving said moveable curved door from said first position to said second position, and
reading information from and/or writing information to, said information storage medium.

2. The method of claim 1, wherein:
said data storage and retrieval system further comprises a robotic accessor;
said robotic accessor performs said retrieving step;
said robotic accessor performs said transporting step; and
said robotic accessor performs said disposing step.

3. The method of claim 2, wherein said information storage medium comprises a magnetic tape.

4. The method of claim 3, wherein said data storage device comprises a tape drive.

5. The method of claim 1, wherein:
said moveable curved door comprises a first radius of curvature R1;
said tape reel comprises a second radius of curvature R2; and
wherein R1 is greater than R2.

6. The method of claim 5, wherein R1/R2 is greater than 2.

7. The method of claim 5, wherein R1/R2 is greater than 3.

8. The method of claim 1, wherein said moveable curved door can be slidingly moved from a first position to a second position.

9. The method of claim 8, wherein said portable data storage cartridge further comprises a spring having a first end and a second end, wherein said first end is attached to said moveable curved door, and wherein said second end is attached to said enclosure.

10. The method of claim 9, wherein said spring exerts a first force on said moveable curved door when said moveable curved door is disposed in said first position, and wherein said spring exerts a second force on said moveable curved door-when said moveable curved is disposed in said second position, wherein said second force is greater than said first force.

11. A method to write information to, or retrieve information from, an information storage medium disposed within a portable data storage cartridge moveably disposed in a data storage and retrieval system, wherein said data storage and retrieval system further comprises a data storage device;
wherein said portable data storage cartridge comprises:
a top;
a bottom;
a plurality of sides, wherein said plurality of sides in combination with said top and said bottom define an enclosure having an opening;
a moveable curved door slidingly disposed within said enclosure, wherein said moveable curved door comprises a first radius of curvature R1 having a center point, wherein said center point lies outside said enclosure;
said method comprising the steps of:
retrieving said portable data storage cartridge from one of said one or more storage slots;
transporting said portable data storage cartridge to said data storage device;
disposing said portable data storage cartridge in said data storage device;
moving said moveable curved door from said first position to said second position, and
reading information from and/or writing information to, said information storage medium.

12. The method of claim 11, wherein:
said data storage and retrieval system further comprises a robotic accessor;
said robotic accessor performs said retrieving step;
said robotic accessor performs said transporting step; and
said robotic accessor performs said disposing step.

13. The method of claim 12, wherein:
said portable data storage cartridge further comprises a tape reel rotatably disposed within said enclosure;
said information storage medium comprises a magnetic tape disposed around said tape reel.

14. The method of claim 13, wherein said data storage device comprises a tape drive.

15. The method of claim 11, wherein
said tape reel comprises a second radius of curvature R2;
R1 is greater than R2.

16. The method of claim 15, wherein R1/R2 is greater than 2.

17. The method of claim 15, wherein R1/R2 is greater than 3.

18. The method of claim 11, wherein said moveable curved door can be slidingly moved from a first position to a second position.

19. The method of claim 18, wherein said portable data storage cartridge further comprises a spring having a first end and a second end, wherein said first end is attached to said moveable curved door, and wherein said second end is attached to said enclosure.

20. The method of claim 19, wherein said spring exerts a first force on said moveable curved door when said moveable curved door is disposed in said first position, and wherein said spring exerts a second force on said moveable curved door-when said moveable curved is disposed in said second position, wherein said second force is greater than said first force.

* * * * *